United States Patent [19]

Broome

[11] Patent Number: 5,277,485
[45] Date of Patent: Jan. 11, 1994

[54] VEHICLE BRAKING SYSTEM

[75] Inventor: William S. Broome, Inkberrow, United Kingdom

[73] Assignee: Grau Limited, Redditch, United Kingdom

[21] Appl. No.: 875,259

[22] Filed: Apr. 27, 1992

[51] Int. Cl.$^5$ .................... B60T 8/34; B60T 13/26
[52] U.S. Cl. ..................... 303/119.1; 303/15; 303/20
[58] Field of Search ............. 303/15, 16, 17, 20, 303/118.1, 119.1, 119.2

[56] References Cited

U.S. PATENT DOCUMENTS

| 4,025,127 | 5/1977 | Rembold | 303/118.1 |
| 4,196,941 | 4/1980 | Goebels | 303/119.2 |
| 4,903,576 | 2/1990 | Höfler et al. | 303/119.1 X |
| 5,090,780 | 2/1992 | Powell | 303/15 |

FOREIGN PATENT DOCUMENTS 9111353  8/1991  PCT Int'l Appl. ............. 303/119.1

Primary Examiner—Robert J. Oberleitner
Assistant Examiner—Kevin D. Rutherford
Attorney, Agent, or Firm—Leydig, Voit & Mayer

[57] ABSTRACT

A vehicle braking system including a braking sub-system comprising; a brake actuator responsive to a brake operating pressure supplied thereto to operate a brake; a supply valve having a fluid pressure inlet and a brake operating pressure outlet connected to the actuator; a control line connected to the supply valve to supply a fluid pressure control signal to which the supply valve is responsive to supply brake operating pressure to the actuator; a pair of solenoid valves in the control line and a managing device responsive to a wheel speed signal to energize the solenoid valves so as to effect one of a) interruption in the supply of the brake operating pressure to the actuator;

b) interruption in the supply of the brake operating pressure to the actuator and exhaust of the brake operating pressure from the actuator;

characterized by the provision of a plurality of the braking sub-systems and by the managing device being arranged to energize the solenoid valves of the sub-systems such that the current consumption of at least one solenoid is reduced from its peak current consumption before the peak current consumption of at least one other solenoid occurs.

12 Claims, 6 Drawing Sheets

VEHICLE BRAKING SYSTEM

BACKGROUND TO THE INVENTION

This invention relates to a vehicle braking system including a braking sub-system comprising; a brake actuator responsive to a brake operating pressure supplied thereto to operate a brake; a supply valve means having a fluid pressure inlet and a brake operating pressure outlet connected to said actuator; a control line connected to the supply valve means to supply a fluid pressure control signal to which the supply valve means is responsive to supply brake operating pressure to the actuator; a pair of solenoid valves in said control line and a managing means responsive to a wheel speed signal to energize the solenoid valves so as to effect one of a) interruption in the supply of said brake operating pressure to the actuator;
b) interruption in the supply of said brake operating pressure to the actuator and exhaust of the brake operating pressure from the actuator.

One version of such a system is described in U.S. Pat. No. 4,025,127 wherein the supply valve means comprises a relay valve, said fluid pressure inlet is connected to a uniform fluid pressure source, said control line is connected to a source of pressure responsive to driver demand to provide said control signal and the relay valve is responsive to the control signal to supply brake operating pressure to the actuator from said source, the brake operating pressure being a function of the control signal pressure, and wherein energization of one of said pair of solenoid valves interrupts the control signal supply to the relay valve whilst energization of both of said solenoid valves at the same time is necessary to interrupt the control signal supply to the relay valve and to exhaust the control signal from the relay valve.

Another version of such a system is described in GB-A-1416204 wherein the supply valve means comprises a regulating valve, said fluid pressure inlet is connected to a variable fluid pressure source, the pressure of which is variable under driver demand, said control line is connected to said variable fluid pressure source to provide said control signal and the regulating valve is responsive to the control signal to supply brake operating pressure to the actuator from said source, the brake operating pressure being a function of the pressure of the variable pressure source, and wherein energization one of said pair of solenoid valves interrupts the supply of brake operating pressure to the actuator whilst energization of both of said solenoid valves at the same time is necessary to interrupt the supply of said brake operating pressure to the actuator and to exhaust the brake operating pressure from the actuator.

In both versions the necessity to energize both solenoids at the same time results in an electrical power consumption which is the summation of that used for each solenoid and, where there is more than one such supply valve on a vehicle such as a trailer, this energization at the same time can cause an excessive current consumption. This can be a considerable problem when considering the voltage drop along the length of long vehicles particularly, for example, when one long vehicle is towing another. It is therefore desirable to reduce the amount of current necessary for the efficient operation of the solenoids.

There is a known technique for reducing the amount of current supplied to a solenoid once the solenoid valve has attained its energized position. Whilst such a means is effective to cut down the total amount of current consumption, for a short period of time it is necessary to fully power the solenoid to cause the solenoid valve correctly to attain its energized position. Thus there exists a peak current consumption during the energization of each solenoid valve and the summation of these peaks can still produce an unacceptably high current consumption.

An object of the present invention is to provide a vehicle braking system in which the above mentioned problem is overcome or is reduced.

SUMMARY OF THE INVENTION

According to the present invention we provide a vehicle braking system including a braking sub-system comprising; a brake actuator responsive to a brake operating pressure supplied thereto to operate a brake; a supply valve means having a fluid pressure inlet and a brake operating pressure outlet connected to said actuator; a control line connected to the supply valve means to supply a fluid pressure control signal to which the supply valve means is responsive to supply brake operating pressure to the actuator; a pair of solenoid valves in said control line and a managing means responsive to a wheel speed signal to energize the solenoid valves so as to effect one of a) interruption in the supply of said brake operating pressure to the actuator;
b) interruption in the supply of said brake operating pressure to the actuator and exhaust of the brake operating pressure from the actuator;

characterized by the provision of a plurality of said braking sub-systems and by said managing means being arranged to energize the solenoid valves of the sub-systems such that the current consumption of at least one solenoid is reduced from its peak current consumption before the peak current consumption of at least one other solenoid occurs.

The solenoids of one pair may be energized simultaneously such that the current consumption of both the solenoids of said one pair is reduced from their peak currents before the peak current consumption of at least one other pair occurs.

Alternatively, the solenoids of each pair may be energized sequentially such that the current consumption of at least one solenoid of a pair is reduced before the peak current consumption of the other solenoid of the pair occurs.

Where the solenoid valves of each pair are energized sequentially; the inlet solenoid valve may comprise said one solenoid valve and the exhaust solenoid valve may comprise said other solenoid valve. However, carrying out of the above described sequential energization of the solenoid valves of each pair in this case results in a slowing down of the overall response time of the vehicle brake support.

A further object of the invention is to provide a vehicle braking system in which the overall response time is minimized.

Accordingly, where the solenoids of each pair are energized sequentially it is preferred that the exhaust solenoid valve comprises said one solenoid valve and said inlet solenoid valve comprises said other solenoid valve.

In one more specific aspect the supply valve means may comprise a relay valve, said fluid pressure inlet being connected to a uniform fluid pressure source, said control line being connected to a source of pressure responsive to driver demand to provide said control signal and the relay valve being responsive to the control signal to supply brake operating pressure to the actuator from said source, the brake operating pressure being a function of the control signal pressure, and wherein energization of one of said pair of solenoid valves interrupts the control signal supply to the relay valve whilst energization of both of said solenoid valves at the same time is necessary to interrupt the control signal supply to the relay valve and to exhaust the control signal from the relay valve.

Each pair of solenoid valves may comprise an inlet solenoid valve, which may permit passage of the control signal to the relay valve when a magnet associated therewith is de-energized and which may be closed by energization of the magnet associated therewith to effect said interruption of the control signal, and an exhaust solenoid valve, which may be opened to exhaust by energization of the magnet associated therewith to effect said exhaust of the control signal from the relay valve.

The inlet and exhaust solenoid valves may be positioned in series in said control line with the inlet valve upstream of the exhaust valve.

Further preferably, where the solenoid valves are positioned in series in said control line, restrictor means are provided to permit restricted communication between the relay valve and the portion of the control line disposed between the inlet and exhaust valves when the exhaust valve is opened to exhaust.

This restricted communication ensures that said portion of the control line is at the same pressure as the control pressure in the relay valve. This avoids an increase in control signal pressure in the relay valve which would otherwise occur if the above mentioned restrictor means were not present and the exhaust valve was arranged both to interrupt the control signal supply and exhaust the control signal from the relay valve.

Alternatively, the inlet valve may be positioned in said control line upstream of a branch from said line in which is provided said exhaust valve.

In a second more specific aspect the supply valve means may comprise a regulating valve, said fluid pressure inlet being connected to a variable fluid pressure source, the pressure of which is variable under driver demand, said control line being connected to said variable fluid pressure source to provide said control signal and the regulating valve is responsive to the control signal to supply brake operating pressure to the actuator from said source, the pressure of the brake operating pressure being a function of the pressure of the variable pressure source, and wherein energization of one of said pair of solenoid valves interrupts the supply of brake operating pressure to the actuator whilst energization of both of said solenoid valves at the same time is necessary to interrupt the supply of said brake operating pressure to the actuator and to exhaust the brake operating pressure from the actuator.

The regulating valve may comprise an inlet valve controlled by an inlet solenoid valve, and an exhaust valve controlled by an exhaust solenoid valve, the inlet solenoid valve
a) when de-energized, interrupting supply of the control signal to an operating chamber of the inlet valve and connecting the operating chamber to exhaust to open the inlet valve and permit passage of said brake operating pressure therethrough;
b) when energized, permitting supply of the control signal to said operating chamber of the inlet valve and disconnecting the operating chamber of the inlet valve from exhaust to close the inlet valve and prevent passage of said brake operating pressure therethrough, the exhaust solenoid valve
a) when de-energized, permitting supply of the control signal to an operating chamber of the exhaust valve and disconnecting the control chamber of the exhaust valve from exhaust to close the exhaust valve and prevent exhaust of said brake operating pressure;
b) when energized, preventing supply of the control signal to the operating chamber of the exhaust valve and connecting the operating chamber of the exhaust valve to exhaust to open the exhaust valve and permit exhaust of said brake operating pressure.

BRIEF DESCRIPTION OF THE DRAWINGS

The invention will now be described in more detail with reference to the accompanying drawings wherein.

DESCRIPTION OF THE PREFERRED EMBODIMENTS

Figure 1:
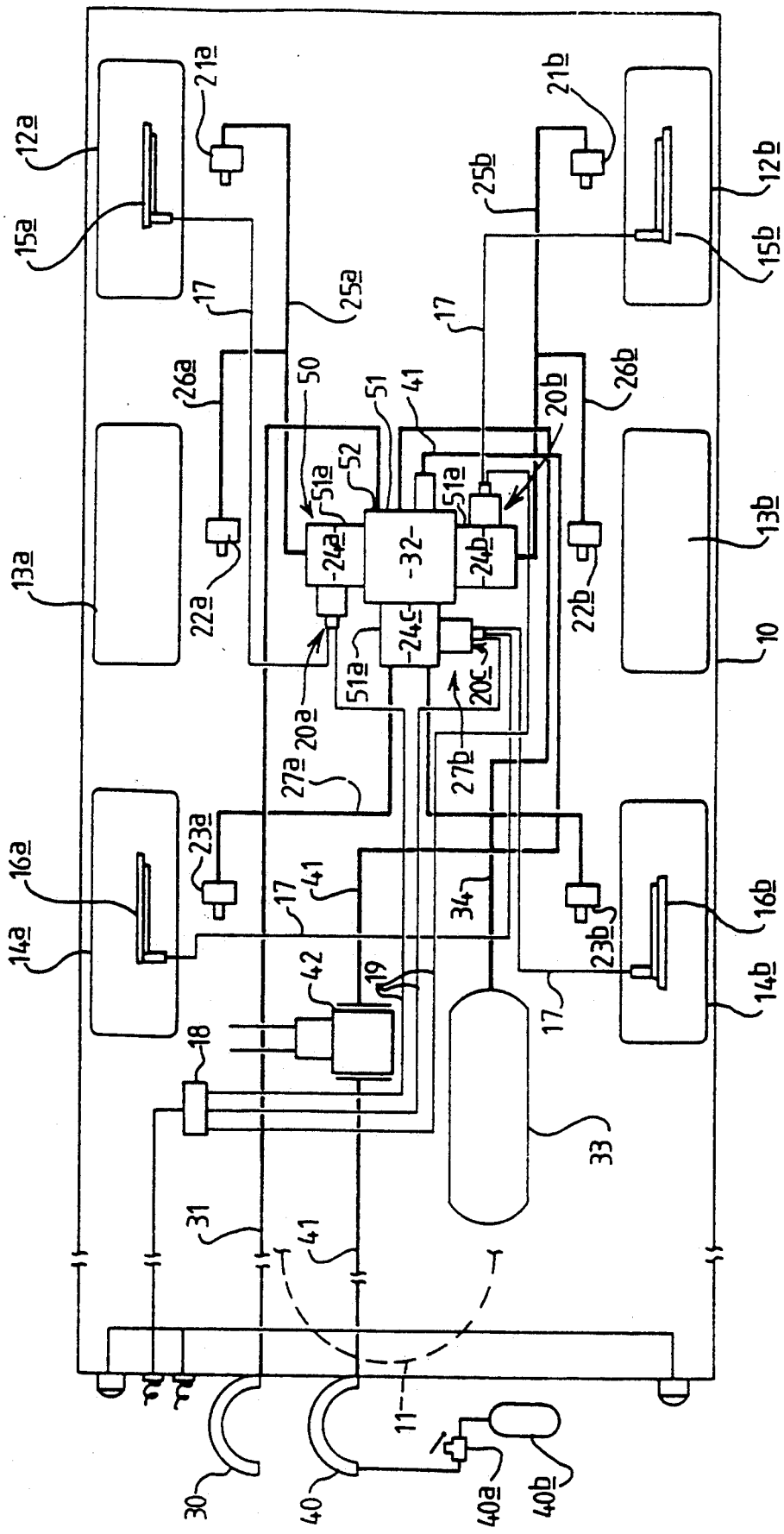
FIG. 1 is a schematic illustration of a vehicle braking system embodying the invention.

Referring to FIG. 1 of the drawings, a semi-trailer is shown at 10 and has a conventional fifth wheel connection 11 and three pairs of wheels 12a, 12b; 13a, 13b; 14a, 14b; disposed towards the rear of the semi-trailer. The trailing and leading pairs of wheels 12a, 12b, 14a, 14b are provided with a wheel speed sensor 15a, 15b and 16a, 16b respectively. If desired, the speed of rotation of the centre pair of wheels 13a, 13b may also be sensed or any other desired pattern of sensing. The wheel speed sensors 15a-16b are of any desired conventional form and provide signals, which are sent via lines 17 and 19, to a controller 18 of conventional type which is responsive to said signals for sensing skid conditions of the wheels and for generating instructions which are sent via lines 19 to skid control units 20a-20c. In the illustrated example the lines 17 from the wheel speed sensors are taken to the skid control units 20a-20c and are then connected to the lines 19 but if desired the lines 17 could extend directly to the control 18. The lines 19 in this case transmitting only the instructions to the skid control units 20a-20c.

All the wheels 12a-14b are provided with wheel brakes having actuators 21a-23b which are responsive to fluid pressure, hereinafter referred to as brake pressure, supplied thereto. The wheel brakes are conventional air operated brakes which are supplied with brake pressure, comprising operating air under pressure, from a fluid pressure source by fluid pressure supply means comprising supply valves 24a-c which in the illustrated example comprise relay valves.

The wheel brake actuator 21a of the right-hand rearmost wheel 12a is connected by a line 25a to a supply relay valve 24a whilst the wheel brake actuator 21b of the left-hand rearmost wheel 12b is connected by a line 25b to a second supply valve 24b. The wheel brake actuator 22a of the middle right-hand wheel 13a is connected to the supply relay valve 24a by a branch line 26a from the line 25a whilst the opposite wheel brake actuator 22b is connected to the supply relay valve 24b by a branch line 26b from the line 25b.

The wheel brake actuator 23a of the right-hand front wheel 14a is connected by a line 27a to a third supply relay valve 24c whilst the wheel brake actuator 23b of the left-hand forward wheel 14b is connected to the supply relay valve 24c by a line 27b.

The fluid pressure source comprises a conventional "emergency" connection 30 for fluid pressure from a tractor vehicle and a line 31 feeding the fluid pressure to a port 52 of an emergency relay valve means 32 and to a fluid pressure reservoir 33 which is connected to the emergency relay valve means 32 by a further line 34 so as to provide a pressure supply, which is uniform in that the pressure does not vary with driver demand, although there may be some change in pressure depending on operating conditions.

A brake command signal, which varies according to driver demand, for example, by means of a driver operated valve 40a supplied with air under pressure from a source 40b, is fed from the braking system of the tractor vehicle via a conventional "service" connection 40 and a line 41 to a load sensing means 42 and by a continuation of the line 41 to the emergency relay valve means 32. The emergency relay valve means 32 provides a brake control signal which is fed by a control line to the supply relay valve 24a-24c via the skid control units 20a-20c. The brake control signal provided by the emergency relay valve is usually a function of the brake command signal but the brake command signal is overridden to apply the brakes fully if the pressure in the "emergency" connection 30 falls below a predetermined pressure. Although it is preferred to provide such an emergency relay valve facility, if desired it may be omitted and the brake command signal may comprise the control signal.

The emergency relay valve means 32, the supply valves 24a-24c and the skid control units 20a-20c are all provided as a single discrete unit 50 which is mounted as a single item on the trailer so that the only connections required are the pneumatic and electrical lines to the unit 50 described hereinbefore. The emergency relay valve means 32 is provided in a discrete housing part 51 which is separate from three further discrete housing parts 51a which provide the supply relay valves 24a-c and the skid control units 20a-20c and these four discrete housing parts are inter-connected as described in more detail in our application No. 9019952.2 to provide said single discrete unit 50.

The fluid pressure brake actuators 21a, 22a, supply relay valve 24a, skid control unit 20a and the associated part of the managing means 18 together comprise a first braking sub-system. Similarly, the brake actuators 21b, 22b, supply relay valve 24b, skid control unit 20b and the associated part of the managing means 18 comprise a second braking sub-system whilst the brake actuators 23a, 23b, supply relay valve 24c, skid control unit 20c and the associated part of the managing means 18 comprise a third braking sub-system.

The braking sub-systems are the same and hence only the first braking sub-system will be described in detail hereinafter with reference to FIG. 2.

Figure 2:
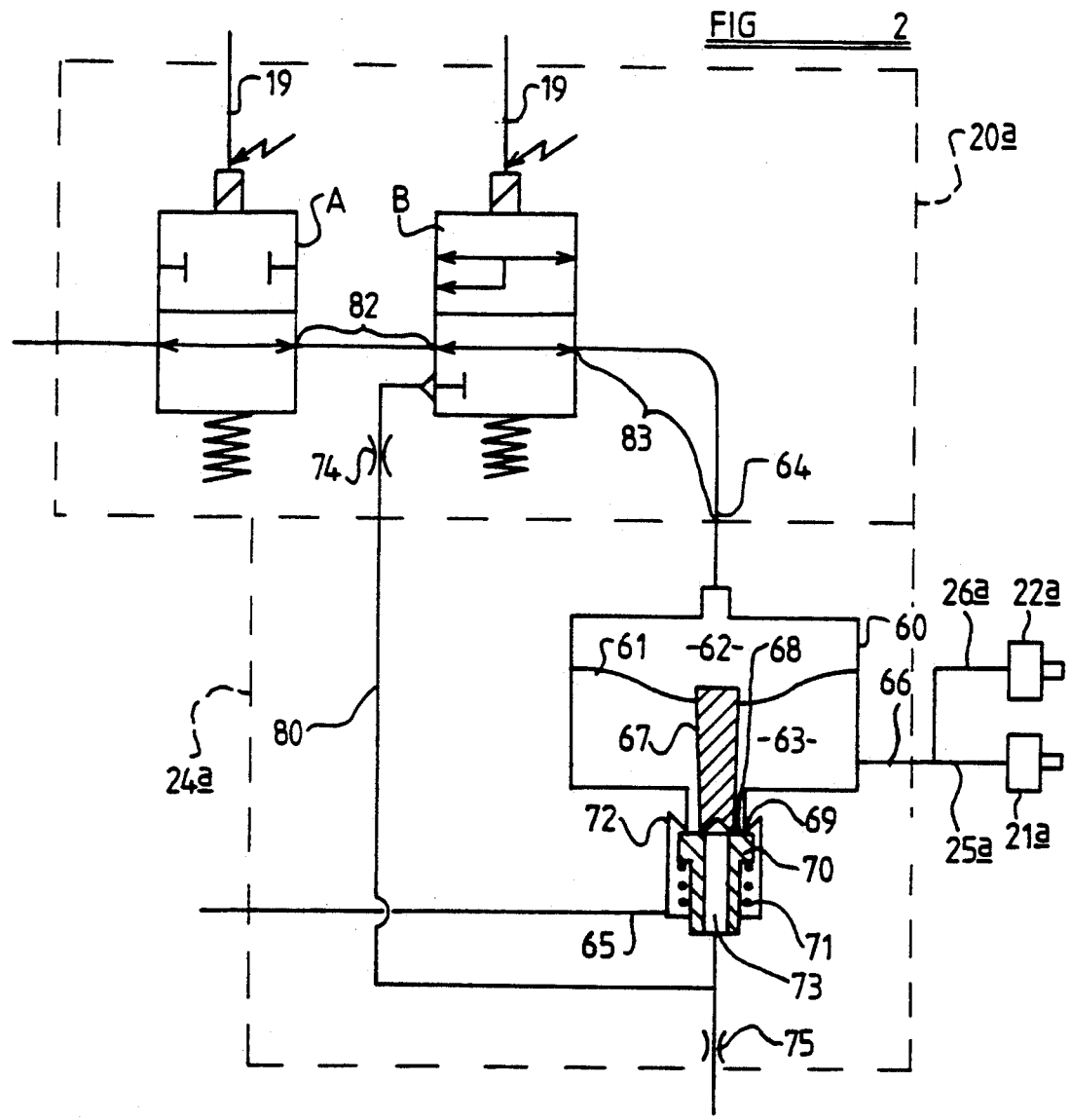
FIG. 2 is a schematic illustration of a braking sub-system of the vehicle braking system of FIG. 1.

Referring now to FIG. 2, the supply relay valve 24a comprises a housing 60 containing a diaphragm 61 above which is defined a control chamber 62 and below which is defined a supply chamber 63. A control line 64 extends from the control chamber 62 to the skid control unit 20a. The valve 24a has a fluid pressure inlet 65 for the supply chamber 63 to which fluid under pressure is fed from the emergency relay valve although, if desired, where no such valve is provided the fluid pressure is supplied from any other suitable source. The chamber 63 also has a fluid pressure outlet 66 which is connected to the brake actuators 21a, 22a by lines 25a, 26a.

A valve piston 67 is carried by the diaphragm 61 and at its lower end 68 is adapted to sealingly engage with a valve seat 69 of a valve member 70. The valve member 70 is resiliently biased by a coil compression spring 71 into sealing engagement with a second valve seat 72. An exhaust passage 73 extends through the valve member 70.

The relay valve 24a operates in conventional manner so that when, in use, a control signal supplied through the line 64 into the control chamber 60 to provide a pressure high enough for the diaphragm 61 to move downwardly and overcome the bias of the spring 71 the valve member 70 is displaced from the valve seat 72 so that fluid under pressure flows from the inlet 65 to the outlet 66, the rate of flow being dependent upon the magnitude of the control signal in conventional manner. When the magnitude of the control signal falls so as to balance the force of the spring 71 supply of air is interrupted by reengagement of the valve member 70 with the valve seat 72 whilst if the control signal falls further the valve piston 67 rises out of sealing engagement with the valve seat 69 so that air in the brake actuators 21a, 21b is exhausted to atmosphere through the passage 73.

The skid control unit 20a comprises a pair of solenoids A, B which are connected in series in the control line 64 and are supplied with a brake control signal by the emergency relay valve means 32. If, however, an emergency relay valve means is not provided, then the control signal may be provided from the conventional "service" connection 40 through any desired intermediate means such as a load sensing means 42 as described hereinbefore.

The solenoid valve A comprises an inlet valve which has a magnet which, when energized by means of a signal from the managing means 18 on the respective line 19, is moved from an open condition in which passage of the control signal is permitted to a closed condition in which supply of the control signal to the relay valve 24a is interrupted.

The solenoid valve B which is disposed downstream in the control line 64 of the solenoid valve A, comprises an exhaust valve which, when its magnet is energized by an appropriate signal on the respective line 19 from the managing means 18 is moved from a condition in which passage of control signal is permitted to a condition in which the control chamber 62 and a portion 82 of the control line 64 between the valves A and B and a portion 83 of the control line 64 downstream of the valve B are opened to atmosphere through an exhaust line 80 which is connected to the exhaust passage 73 of the relay valve.

If desired a suitable flow restrictor may be provided in the line 80 where indicated at 74 and alternatively or in addition a suitable flow restrictor may be provided in the exhaust from the relay valve 24a as indicated at 75 to minimize length between the control signal and the brake pressure in convenient manner.

Figure 3:
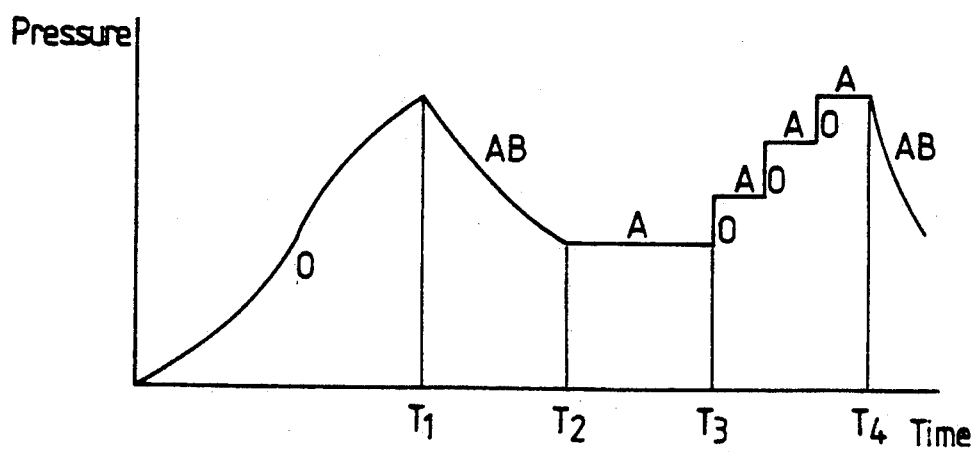
FIG. 3 is a graphical representation of the brake actuator pressure/time relationship in a typical ABS cycle.

Referring now to FIG. 3, there is shown a typical ABS cycle in which in the system shown in FIG. 2, the following sequence of events takes place.

During an initial time period up to time T1 both solenoids A and B are de-energized as indicated as O in FIG. 3. The control signal is passed through both solenoid valves into the control chamber 62 of the relay valve 24a and thus the pressure therein follows the brake command signal. At time T1 the managing means 18 senses an incipient skid condition and causes both solenoid valves A and B to be energized, as indicated at A, B in FIG. 3. Solenoid valve A interrupts the control signal whilst the solenoid valve B connects the control chamber 62 to atmosphere. The pressure falls until time T2 when the managing means senses that it is appropriate to maintain the existing pressure in the control chamber 62 and the solenoid valve B is de-energized whilst the solenoid valve A remains energized, as indicated at A in FIG. 3 and hence the pressure is maintained. At time T3 the managing means provides a signal to de-energize the solenoid A so that the control signal is again supplied to the relay valve, as indicated at O. Shortly thereafter the managing means determines that the control pressure is to be held so that the solenoid A is again energized, as indicated at A. This is repeated for a desired number of steps until time T4 is reached at which the managing means determines that it is necessary again to reduce the pressure in the control chamber 62 so that both the valves A and B are energized together and the control pressure in the control chamber 62 is exhausted to atmosphere.

If the managing means 18 senses the need to perform such a cycle in respect of more than one of the braking sub-systems, at the same time, more than one pair of solenoids are energized simultaneously with a consequent high current consumption. As mentioned hereinbefore this presents problems, particularly where it is desired to electrically power the vehicle braking system from, for example, the brake light supply of a vehicle trailer.

Figure 4:
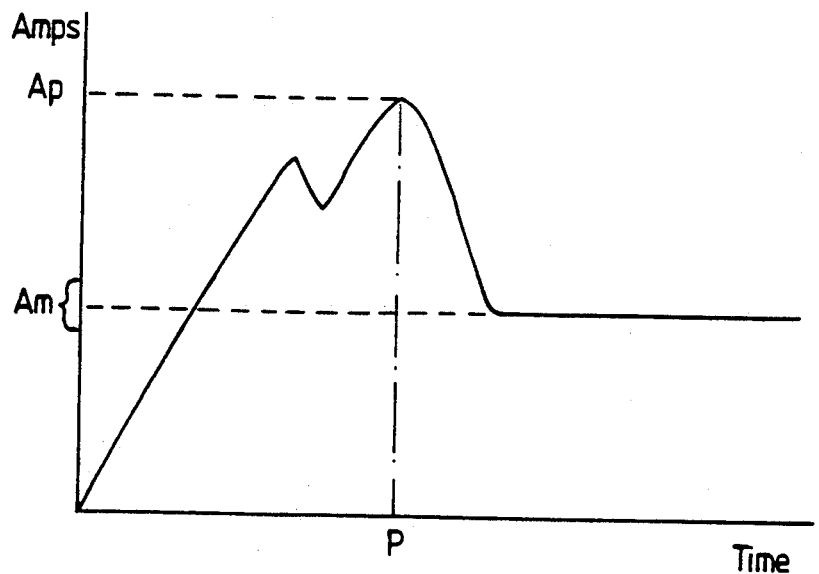
FIG. 4 is a graphical representation of the current/time relationship occurring on energization of a solenoid valve.

Referring to FIG. 4, in order to minimize the power consumption it is arranged that the managing means 18, when providing an energizing current for a solenoid provides the current in a manner such that, after a peak current Ap, which is sufficient to ensure that the solenoid valve has moved from its de-energized position to its energized position, has occurred, the current is reduced to a level Am which is adequate to maintain the solenoid valve in its energized condition. In the present example the current is reduced after a predetermined period of time Tp which it is known is adequate for such change of condition to satisfactorily have taken place.

Although the above technique of current reduction is effective once a solenoid has changed condition, if two or more of the braking sub-systems are actuated simultaneously a considerable peak current consumption still occurs.

Figure 5:
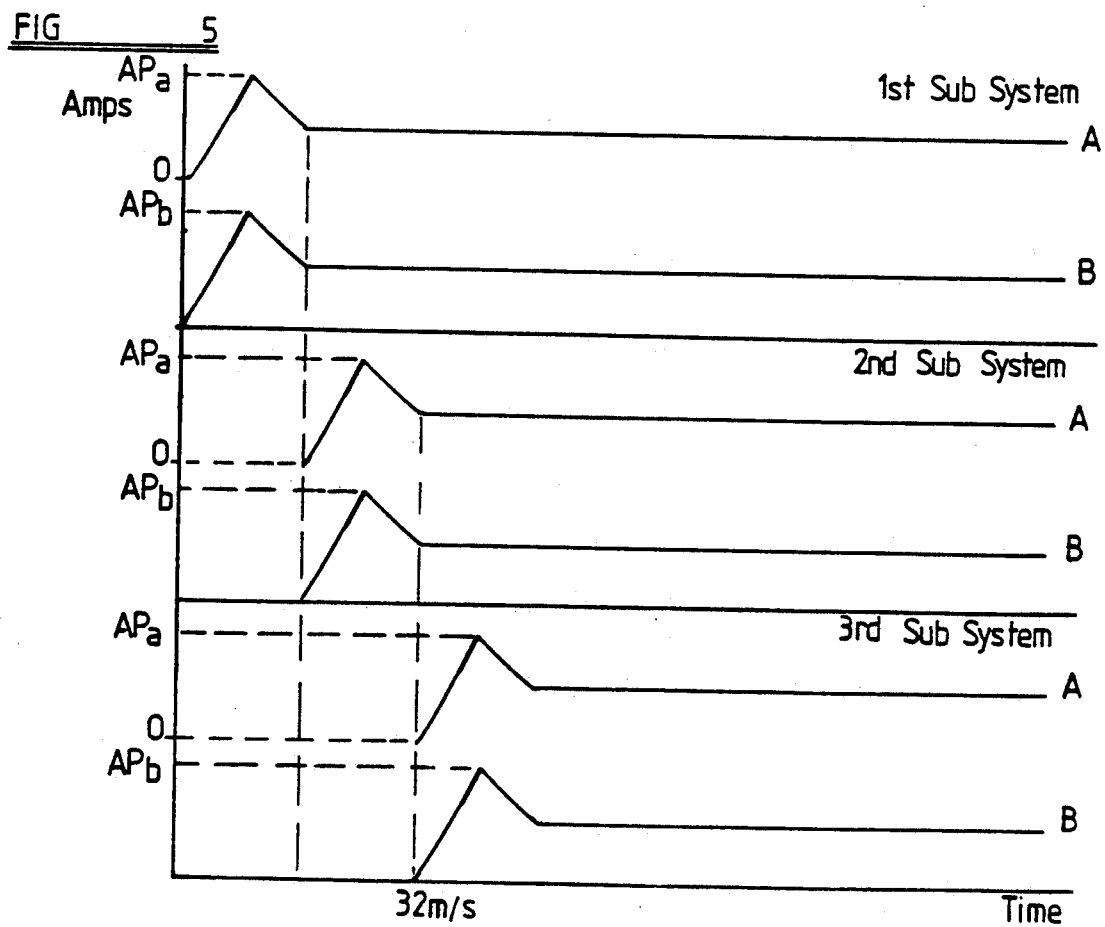
FIG. 5 is a graphical representation showing the current/time relationship of solenoid valves of a vehicle braking system of one embodiment of the invention.

One way, according to the present invention, of avoiding this problem is by arranging for the managing means 18 to energize the solenoids of at least two of the sub-systems sequentially. Referring to FIG. 5, each sub-system has both of its solenoids energized simultaneously but the energization of each sub-system is sequenced so that each successive energization takes place after the peak current consumption of the preceding sub-system energization has occurred. However, a relatively long time period, for example 32 milliseconds (hereinafter "m/s") may elapse between the energization of the first sub-system and the third sub-system which provides an undesirably coarse ABS cycle.

A shorter time interval can be achieved by arranging that the solenoid valves of two of the sub-systems are energized simultaneously whilst the solenoid valves of the remaining sub-system are energized after or before the peak current consumption of said first two sub-systems but such an arrangement increases the total current consumption which is not acceptable in all circumstances.

Figure 6:
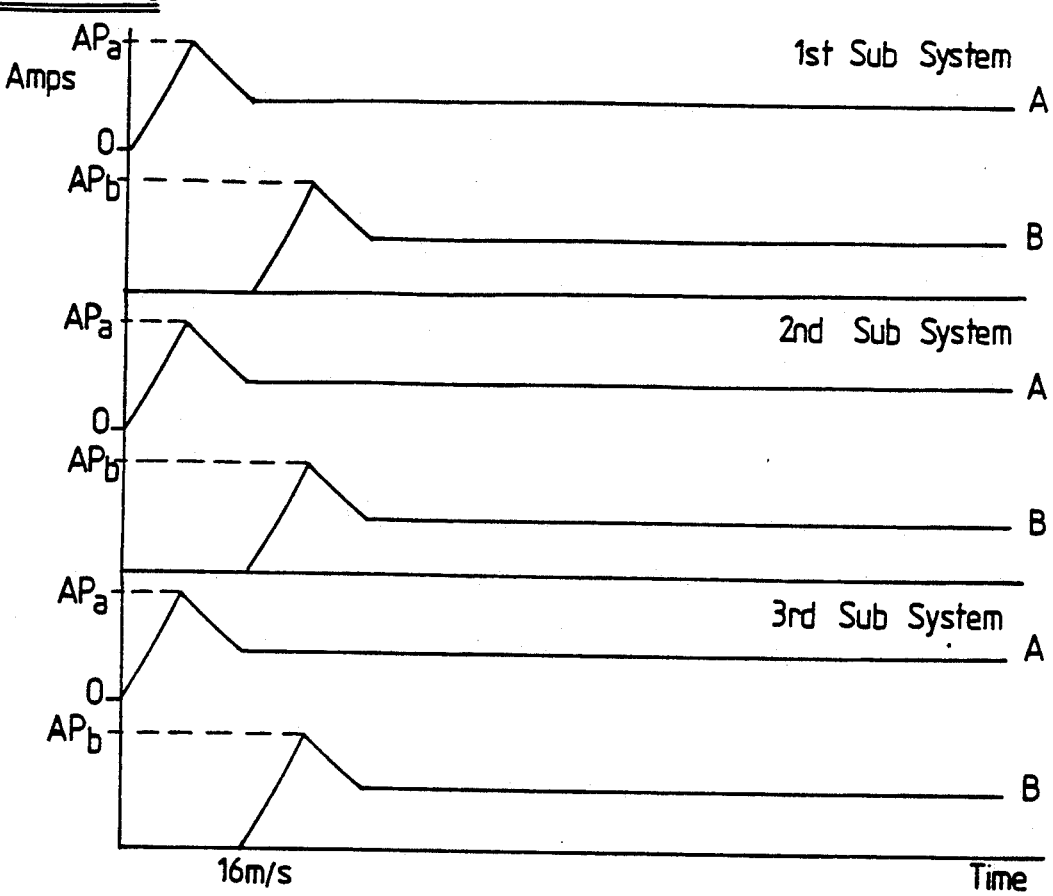
FIG. 6 is a graphical representation showing the current/time relationship of solenoid valves in an alternative embodiment of the invention.

FIG. 6 illustrates an alternative embodiment where one solenoid valve of each sub-system is energized simultaneously but is energized such that its peak current consumption has passed before the other solenoid of the respective sub-system is energized or at least is fully energized.

In the embodiment described hereinbefore with reference to FIG. 2, the inlet valve A is energized before the exhaust valve B for each sub-system system. Thus, even when the managing means demands that the sub-systems be energized simultaneously, a maximum of three solenoids is simultaneously energized so that the maximum current consumption is that demanded by only three solenoids whilst the time delay before the second solenoid is energized is only that required for the peak consumption of the first solenoid to take place and to be reduced to the range Am which typically takes 16 m/s. Accordingly this system provides a satisfactorily low current consumption and a satisfactorily rapid response time.

Figure 7:
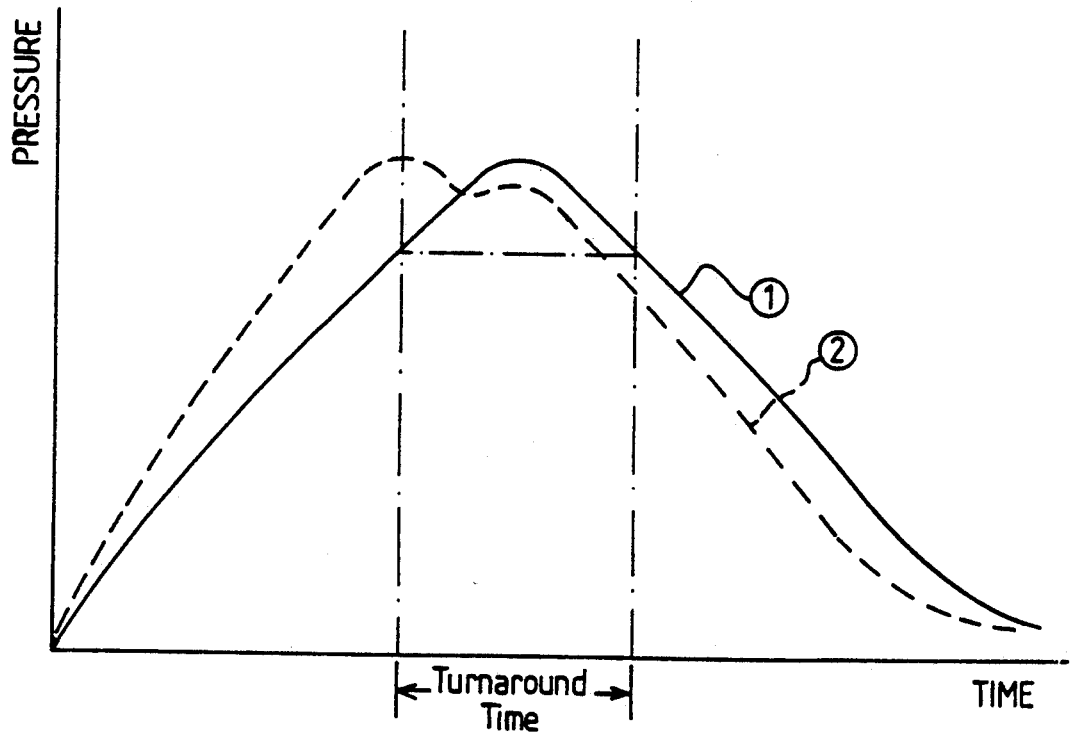
FIG. 7 is a graphical representation comparing the pressure/time relationship occurring in respect of control pressure and brake pressure of a relay valve.

However, carrying out this procedure on every application of the ABS system results in a slowing down of the overall response time since, as illustrated in FIG. 7, there is a lag in the pressure in the brake actuator as indicated in full line 1 in FIG. 7 compared with the pressure in the control chamber of the relay valve as indicated in dashed line 2. The time interval between the time at which the pressure in the brake actuator starts to fall and the time at which the pressure in the brake actuator falls to the pressure obtaining therein when the pressure in the control chamber started to fall is known as the overall response or turnaround time and is thus indicated in FIG. 7. It is desirable to minimize this turnaround time.

The turnaround time may be minimized energizing the exhaust valve B before the inlet valve A so that the control chamber 62 of the relay valve is vented to atmosphere more quickly than in the previously described arrangement where the inlet valve A is energized first. The time interval involved of, for example, 16 m/s, is sufficiently small that the volume of control signal air which flows to exhaust before the inlet valve A is energized is acceptable.

Figure 8:
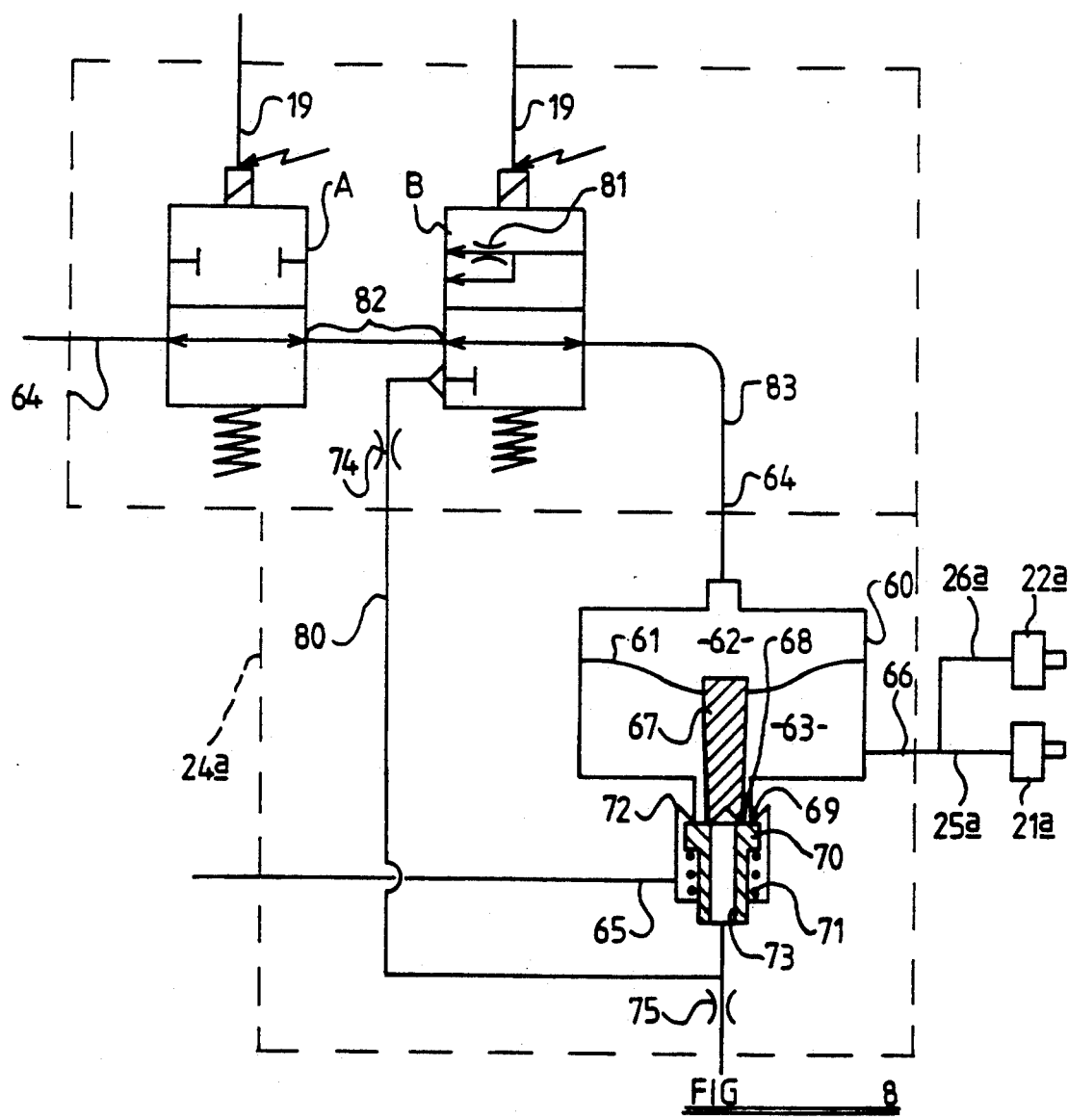
FIG. 8 is a schematic illustration of an alternative braking sub-system of the vehicle braking system of FIG. 1.

However, it is preferred that a valve configuration be provided as shown in FIG. 8 in which the same reference numerals are used as are used in FIG. 2 to refer to corresponding parts. The brake sub-system shown in FIG. 8 is the same as that shown in FIG. 2 except that when the magnet of the solenoid valve B is energized a restrictor 81 is interposed in the control line 64 so that the portion 82 of the control line 64 between the solenoid valves A, B is still connected but in restricted flow communication with the part 83 of the line 64 between the solenoid valve B and the control chamber 62, as well as being connected to exhaust. Accordingly, in this embodiment, as in the FIG. 2 embodiment, when operated by energizing solenoid valve B before solenoid valve A pressure in the part 82 of the control line 64 is at the same pressure at that obtaining in the chamber 62 when the chamber 62 is connected to exhaust through the line 80. This prevents the pressure in the control chamber 62 being increased by the magnitude of pressure in the part 82 of the control line on de-energization of the valve B which would otherwise occur and which would lead to an increase in pressure in the brake actuators 22a, 22b with a consequent risk of initiating wheel skidding. The presence of the restrictor, however, prevents undue air loss from upstream of solenoid valve B due to connection of line 64 to exhaust slightly before solenoid valve A closes off said line 64.

Figure 9:
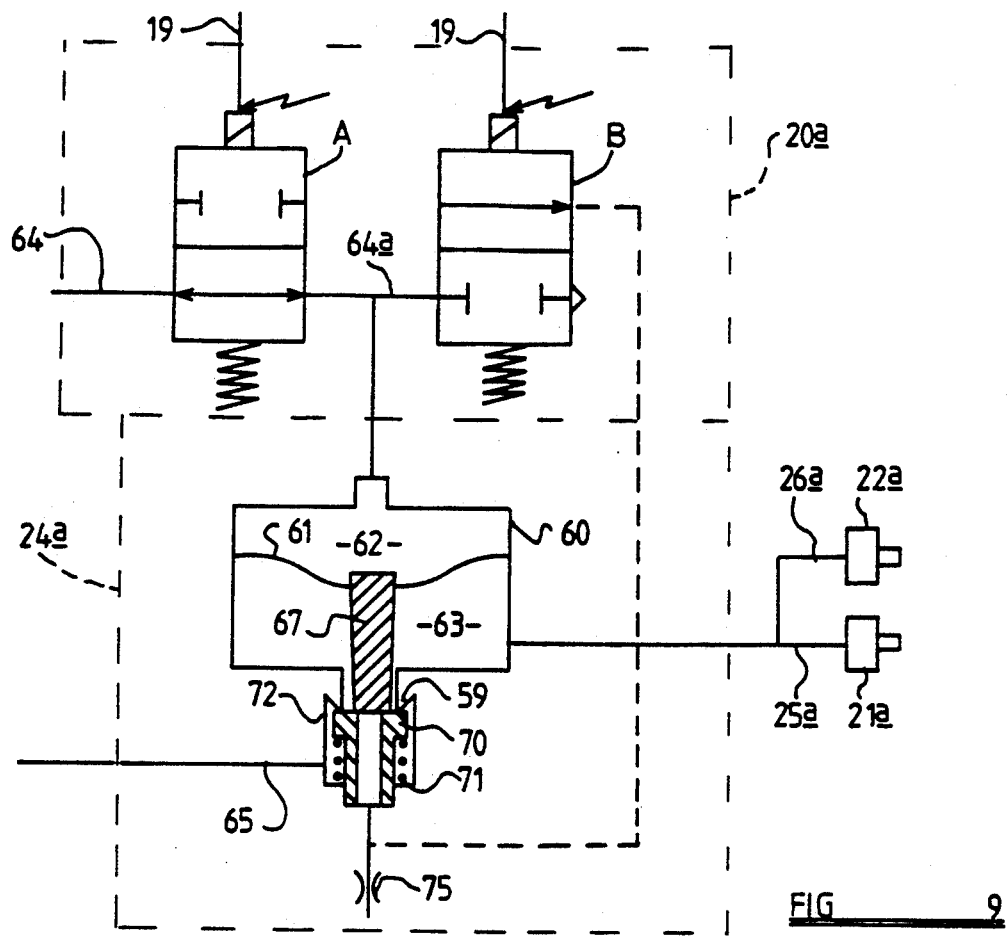
FIG. 9 is a schematic illustration of a further alternative braking sub-system of the vehicle braking system of FIG. 1.

Referring now to FIG. 9, there is shown a schematic illustration of a further alternative braking sub-system of the vehicle braking system of FIG. 1 in which the same reference numerals are used as are used in FIG. 2 to refer to corresponding parts. The brake sub-system shown in FIG. 9 is the same as that shown in FIG. 2 except that the solenoid valve B which comprises an exhaust solenoid valve is not connected in series with the solenoid valve A but, instead, is provided at one end of a branch 64a of the control line 64. The exhaust solenoid valve B is of a different configuration, therefore, to that shown in FIG. 2 in that in its de-energized position the branch 64a is closed, whilst when the solenoid valve is energized the branch 64a is opened to atmosphere and preferably connects the branch 64a to the exhaust outlet of the relay valve 60 as in the case of the FIG. 2 embodiment.

As in the FIG. 2 and FIG. 8 embodiments, the solenoids A and B of each sub-system may be energized simultaneously but with the solenoids of different sub-systems energized sequentially or, alternatively, the solenoids A and B of each pair may be energized sequentially whilst one solenoid of each sub-system may be energized simultaneously. The solenoid A may be energized before solenoid B or, alternatively, solenoid B may be energized shortly before solenoid A on the same basis as in the previously described embodiments.

Figure 10:
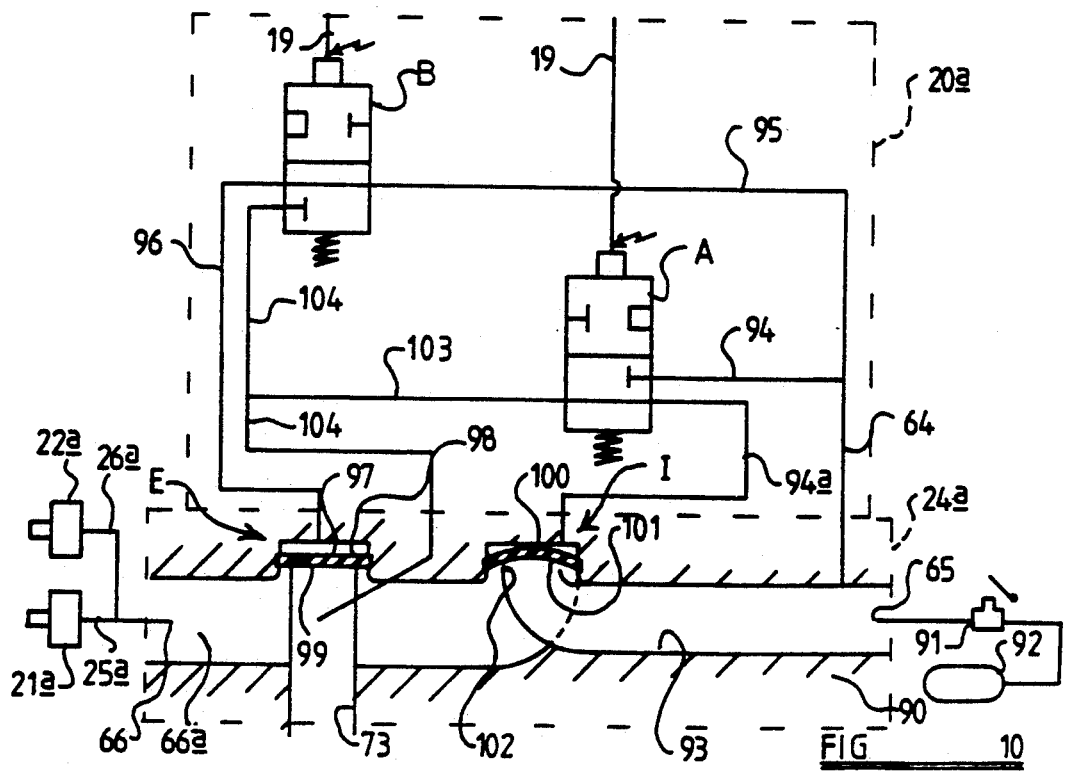
FIG. 10 is a schematic illustration of a still further alternative braking sub-system of the vehicle braking system of FIG. 1.

Referring now to FIG. 10, there is shown a still further alternative braking sub-system of the vehicle braking system of FIG. 1 and the same reference numerals are used as are used in FIG. 2 to refer to corresponding parts. In this embodiment the supply valve is not a relay valve but an "in-line" regulator valve 90 having a fluid pressure inlet 65 which is connected to a fluid pressure source the pressure of which is variable under driver demand, for example by a driver operated valve 91 provided with air under pressure from a source such as a reservoir 92. The volume of air supplied to the inlet 65 is sufficient to provide the brake operating pressure which is fed from an outlet 66 via lines 25a and 26a to the brake actuators 21a, 22a.

A control line 64 extends from an inlet passage 93 of the regulating valve 90 so as to be connected to the variable fluid pressure source to provide a control signal in the line 64. The line 64 has a first branch 94 which extends to an inlet solenoid operated valve A and a second branch 95 which extends to an exhaust solenoid operated valve B. The solenoid valves A and B are energized by the managing means 18 along line 19. The control line 64 has a further branch 96 which extends from the exhaust solenoid valve B to a control chamber 97 of an exhaust valve E having a diaphragm 98 adapted to be moved into and out of sealing engagement with a seat 99 provided on an exhaust passage 73.

A further branch 94a extends from inlet solenoid valve A to a control chamber 100 of an inlet valve I having a diaphragm 101 which is movable into and out of sealing engagement with a seat 102 on the inlet passage 93. A further branch 103 extends from the inlet solenoid valve A to a branch 104 which extends from the exhaust solenoid valve B to the exhaust passage 73.

In use, with both valves de-energized and when a brake operating signal is supplied by the driver operated valve 91 air, under a pressure controlled by the valve 91, passes through the inlet passage 93 and through the valve I since the diaphragm 101 is lifted out of engagement with the seat 102 by the air pressure since the control chamber 100 is exhausted to atmosphere through branch 94a, valve A and branches 103 and 104, the valve A at this stage interrupting the supply of control signal to the chamber 100 through branch 94. In addition, a control signal is supplied through branch 95, valve B and branch 96 to the operating chamber 97 of the exhaust valve E so as to maintain the diaphragm 98 in engagement with the seat 99 and thus close an outlet passage 66a from exhaust.

When the managing means 18 determines that an ABS cycle, such as described hereinbefore with reference to FIG. 3, is to take place, a signal would be provided to both solenoids A and B so that solenoid A is moved to its energized position in which the control signal is fed via branches 94 and 94a to the operating chamber 100 of the inlet valve I to block supply of fluid under pressure to the actuators 21a and 22a whilst solenoid valve B, in its energized position, connects the operating chamber 97 of the exhaust valve E to atmosphere via branches 96 and 104, the branch 103 being closed by the valve A in its energized condition, and thus the brake operating pressure is exhausted from the actuators 21a, 22a. When, at time T2 the solenoid valve B is de-energized and whilst the solenoid valve A remains energized, the valve B again supplies a control signal via branches 95 and 96 to the operating chamber 97 of the exhaust valve E to close the exhaust valve and prevent exhaust of brake operating pressure from the actuators 21a, 22a whilst the valve A remains energized to maintain the inlet valve I closed. At time T3 the solenoid A is de-energized so that the control signal is again blocked from supply to the operating chamber 100 of the inlet valve and the operating chamber is connected to exhaust so that the inlet valve can open and brake operating pressure can again be supplied through the regulating valve 90 to the actuators 21a, 22a.

As in the previously described embodiments, if the managing means 18 senses the need to perform such a cycle in respect of more than one of the braking sub-systems at the same time, more than one pair of solenoids would be energized simultaneously with a consequent high current consumption. Accordingly, as described in connection with the previous embodiments, either both solenoids of each sub-system can be energized simultaneously although the energization of each sub-system is sequenced so that each successive energization takes place after the peak current consumption of the preceding sub-system energization has occurred, as described previously in connection with FIG. 5, or the non-solenoid valve of each sub-system is energized simultaneously but is energized such that its peak current consumption has passed before the other solenoid of the respective sub-system is energized or at least is fully energized, as described previously with reference to FIG. 6. In this embodiment the solenoid valve A may be energized shortly before the solenoid valve B or vice versa, on the same basis as in the previously described embodiments.

The features disclosed in the foregoing description, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

I claim:

1. A vehicle braking system including a plurality of braking sub-systems, each braking sub-system comprising: a brake actuator responsive to a brake operating pressure supplied thereto to operate a brake; a supply valve means having a fluid pressure inlet and a brake operating pressure outlet connected to said actuator; a control line connected to the supply valve means to supply a fluid pressure control signal to which the supply valve means is responsive to supply brake operating pressure to the actuator; a pair of solenoid valves in said control line to selectively effect both
   a) interruption in the supply of said brake operating pressure to the actuator; and
   b) interruption in the supply of said brake operating pressure to the actuator and accompanied by exhaustion of the brake operating pressure from the actuator,
one of said interruptions being effected by the solenoid valves of each pair of solenoid valves being energized at the same time; and a managing means responsive to wheel speed signals to energize the solenoid valves of the sub-systems so that the current consumption of at least one solenoid is reduced from a peak current consumption before a peak current consumption of at least one other solenoid occurs to cause the solenoids to be energized at said same time.

2. A system according to claim 1 wherein the solenoids of one braking sub-system are energized simultaneously and the current consumption of both the solenoids of said one braking sub-system is reduced from the peak current before the peak current consumption of the solenoids of at least one other braking sub-system occurs.

3. A system according to claim 1 wherein the solenoids of each pair are energized sequentially and the current consumption of one solenoid of each pair is reduced before the peak current consumption of the other solenoid of each pair occurs.

4. A system according to claim 3 wherein said one solenoid valve comprises an inlet solenoid valve and said other solenoid valve comprises an exhaust solenoid valve.

5. A system according to claim 3 wherein said one solenoid valve comprises an exhaust solenoid valve and said other solenoid valve comprises an inlet solenoid valve.

6. A system according to claim 1 wherein the supply valve means comprises a relay valve, said fluid pressure inlet being connected to a uniform fluid pressure source, said control line being connected to a source of pressure responsive to driver demand to provide said control signal and the relay valve being responsive to the control signal to supply brake operating pressure to the actuator from said source, the brake operating pressure being a function of the control signal pressure, and wherein energization of one of said pair of solenoid valves interrupts the control signal supply to the relay valve whilst energization of both of said solenoid valves at the same time is necessary to interrupt the control signal supply to the relay valve and to exhaust the control signal from the relay valve.

7. A system according to claim 6 wherein each pair of solenoid valves comprises an inlet solenoid valve, which permits passage of the control signal to the relay valve when a magnet associated therewith is de-energized and which is closed by energization of the magnet associated therewith to effect said interruption of the control signal, and an exhaust solenoid valve, which is opened to exhaust by energization of the magnet associated therewith to effect said exhaust of the control signal from the relay valve.

8. A system according to claim 7 wherein the inlet and exhaust solenoid valves are positioned in series in said control line with the inlet valve upstream of the exhaust valve.

9. A system according to claim 8 wherein restrictor means are provided to permit restricted communication between the relay valve and the portion of the control line disposed between the inlet and exhaust valves when the exhaust valve is opened to exhaust.

10. A system according to claim 7 wherein the inlet valve is positioned in said control line upstream of a branch from said line in which is provided said exhaust valve.

11. A system according to claim 1 wherein the supply valve means comprises a regulating valve, said fluid pressure inlet being connected to a variable fluid pressure source, the pressure of which is variable under driver demand, said control line being connected to said variable fluid pressure source to provide said control signal and the regulating valve is responsive to the control signal to supply brake operating pressure to the actuator from said source, the pressure of the brake operating pressure being a function of the pressure of the variable pressure source, and wherein energization of one of said pair of solenoid valves interrupts the supply of brake operating pressure to the actuator whilst energization of both of said solenoid valves at the same time is necessary to interrupt the supply of said brake operating pressure to the actuator and to exhaust the brake operating pressure from the actuator.

12. A system according to claim 11 wherein the regulating valve comprises an inlet valve controlled by an inlet solenoid valve, and an exhaust valve controlled by an exhaust solenoid valve, the inlet solenoid valve a) when de-energized, interrupting supply of the control signal to an operating chamber of the inlet valve and connecting the operating chamber to exhaust to open the inlet valve and permit passage of said brake operating pressure therethrough;

b) when energized permitting supply of the control signal to said operating chamber of the inlet valve and disconnecting the operating chamber of the inlet valve from exhaust to close the inlet valve and prevent passage of said brake operating pressure therethrough, the exhaust solenoid valve a) when de-energized, permitting supply of the control signal to an operating chamber of the exhaust valve and disconnecting the control chamber of the exhaust valve from exhaust to close the exhaust valve and prevent exhaust of said brake operating pressure;

b) when energized, preventing supply of the control signal to the operating chamber of the exhaust valve and connecting the operating chamber of the exhaust valve to exhaust to open the exhaust valve and permit exhaust of said brake operating pressure.

* * * * *